(12) United States Patent
Laroia et al.

(10) Patent No.: US 7,292,868 B2
(45) Date of Patent: Nov. 6, 2007

(54) APPARATUS AND METHOD FOR USE IN PAGING MODE IN WIRELESS COMMUNICATIONS SYSTEMS

(75) Inventors: Rajiv Laroia, Basking Ridge, NJ (US); Junyi Li, Bedminster, NJ (US); Sathyadev Venkata Uppala, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 477 days.

(21) Appl. No.: 10/829,901

(22) Filed: Apr. 22, 2004

(65) Prior Publication Data

US 2004/0209628 A1    Oct. 21, 2004

Related U.S. Application Data

(62) Division of application No. 09/756,066, filed on Jan. 8, 2001, now Pat. No. 6,816,736.

(51) Int. Cl.
  *H04Q 7/20*   (2006.01)
  *H04B 7/212*  (2006.01)
  *H04J 3/00*   (2006.01)
(52) U.S. Cl. .................. 455/458; 370/337; 370/347
(58) Field of Classification Search ............. 455/458; 370/347, 337
See application file for complete search history.

(56) References Cited

U.S. PATENT DOCUMENTS

| 5,511,110    | A   |   | 4/1996 | Drucker          |         |
|--------------|-----|---|--------|------------------|---------|
| 5,604,744    | A   | * | 2/1997 | Andersson et al. | 370/347 |
| 5,930,706    | A   |   | 7/1999 | Raith            |         |
| 6,532,224    | B1  | * | 3/2003 | Dailey           | 370/337 |
| 2002/0090959 | A1  | * | 7/2002 | Laroia et al.    | 455/458 |

FOREIGN PATENT DOCUMENTS

| EP | 0936757    | 8/1999  |
|----|------------|---------|
| WO | WO00/69209 | 11/2000 |

* cited by examiner

*Primary Examiner*—William D. Cumming

(57) ABSTRACT

In a unique paging time slot format, each of the allocated paging time slots occurs periodically and is split into several prescribed paging time slots including at least one first type paging time slot having a relatively short duration and at least one second type paging time slot having a longer duration. The at least one first type paging time slots is of relatively short duration and transports an indication whether a particular associated wireless terminal was paged. The second type paging time slot is of longer duration than the first type time slot and transports the entire paging message. The paging time slots are periodically transmitted and intended for at least one particular wireless terminal.

11 Claims, 3 Drawing Sheets

APPARATUS AND METHOD FOR USE IN PAGING MODE IN WIRELESS COMMUNICATIONS SYSTEMS

RELATED APPLICATIONS

This application is a Divisional Application from U.S. patent application Ser. No. 09/756,066 filed on Jan. 8, 2001 now U.S. Pat. No. 6,816,736. U.S. patent application Ser. No. 09/756,384 and U.S. patent application Ser. No. 09/756,370 were filed on Jan. 8, 2001.

TECHNICAL FIELD

This invention relates to wireless communications systems and, more particularly, to wireless communications between wireless terminals and base stations.

BACKGROUND OF THE INVENTION

In wireless communications systems, wireless terminals (WTs) are paged, i.e., have special messages—so-called paging messages—sent to them, by associated base stations (BSs) to initiate communications. In order to realize this, the base stations typically have a channel on the downlink called the paging channel. In prior known paging arrangements, the paging channel is subdivided into a plurality of paging time slots. A group of wireless terminals is typically allocated a paging time slot of a prescribed periodicity for receiving paging messages from associated base stations. As shown in FIG. 1, wireless terminals 1 to N are allocated to time slot 1, wireless terminals N+1 to Y are allocated to time slot 2, and so on. Each wireless terminal is expected to monitor for paging messages from an associated base station during these paging time slots. To this end, the periodicity of the paging time slots is made sufficiently long that each of the wireless terminals can effectively turn off most of its circuitry between two of its designated paging time slots and, thus, save energy. This is referred to as the wireless terminal entering a so-called "sleep" mode. The wireless terminal, even though in the sleep mode, still has to keep track of the received paging time slots. The wireless terminal is caused to "wake up" prior to the arrival of its designated paging time slot, tunes to the downlink channel, and achieves carrier, timer and frame synchronization. Then, the wireless terminal decodes the paging time slot, and if its identifier is included in the wireless terminal's designated paging time slot, it knows that the paging message is meant for it. The wireless terminal then takes the appropriate action indicated in the paging message. If the paging message is not meant for the wireless terminal, it returns to the sleep mode, and monitors the next received paging time slot designated for it.

A disadvantage of this prior paging arrangement is that the wireless terminal has to decode the entire paging message in order to determine if the message is meant for it. When many wireless terminals share the paging time slot, it is quite likely that the paging message is not meant for that particular wireless terminal. This can cause the wireless terminal to expend power and reduce its battery life unnecessarily.

SUMMARY OF THE INVENTION

Problems and limitations of prior wireless paging arrangements are overcome by employing a unique paging time slot format. In the unique paging time slot format, each of the allocated paging time slots occurs periodically and is split into several prescribed paging time slots including at least one first type paging time slot having a relatively short duration and at least one second type paging time slot having a longer duration. The at least one first type paging time slot is of relatively short duration and transports an indication whether a particular associated wireless terminal was paged. The second type paging time slot is of longer duration than the first type time slot and transports the entire paging message.

Specifically, a base station periodically transmits paging time slots intended to transport paging messages to one or more wireless terminals that are normally in a standby mode. Each individual paging time slot includes one or more of the first type paging time slots and at least one associated second type paging time slot. The first type paging time slot includes fewer bits than its associated second paging time slot and is intended to transport an indication that a particular one of the wireless terminals has been paged. The second type paging time slot being intended to transport a complete paging message for a paged wireless terminal.

A technical advantage of this unique two type time slot format is that only a small number of bits need to be transmitted from a base terminal and, then, decoded by a receiving wireless terminal from its designated first type time slot to determine if the paging message in the second type time slot is meant for it. As a result, the wireless terminal does not have to perform as much "work" for paging messages not intended for it, and consequently conserves power and extends battery life.

DETAILED DESCRIPTION

Figure 1:
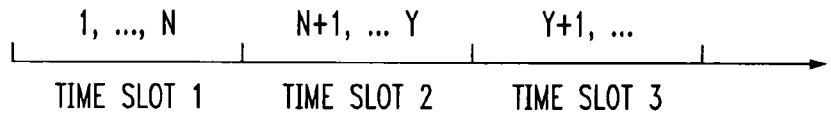
FIG. 1 is a graphic representation of a prior known paging time slot format.
Figure 2:
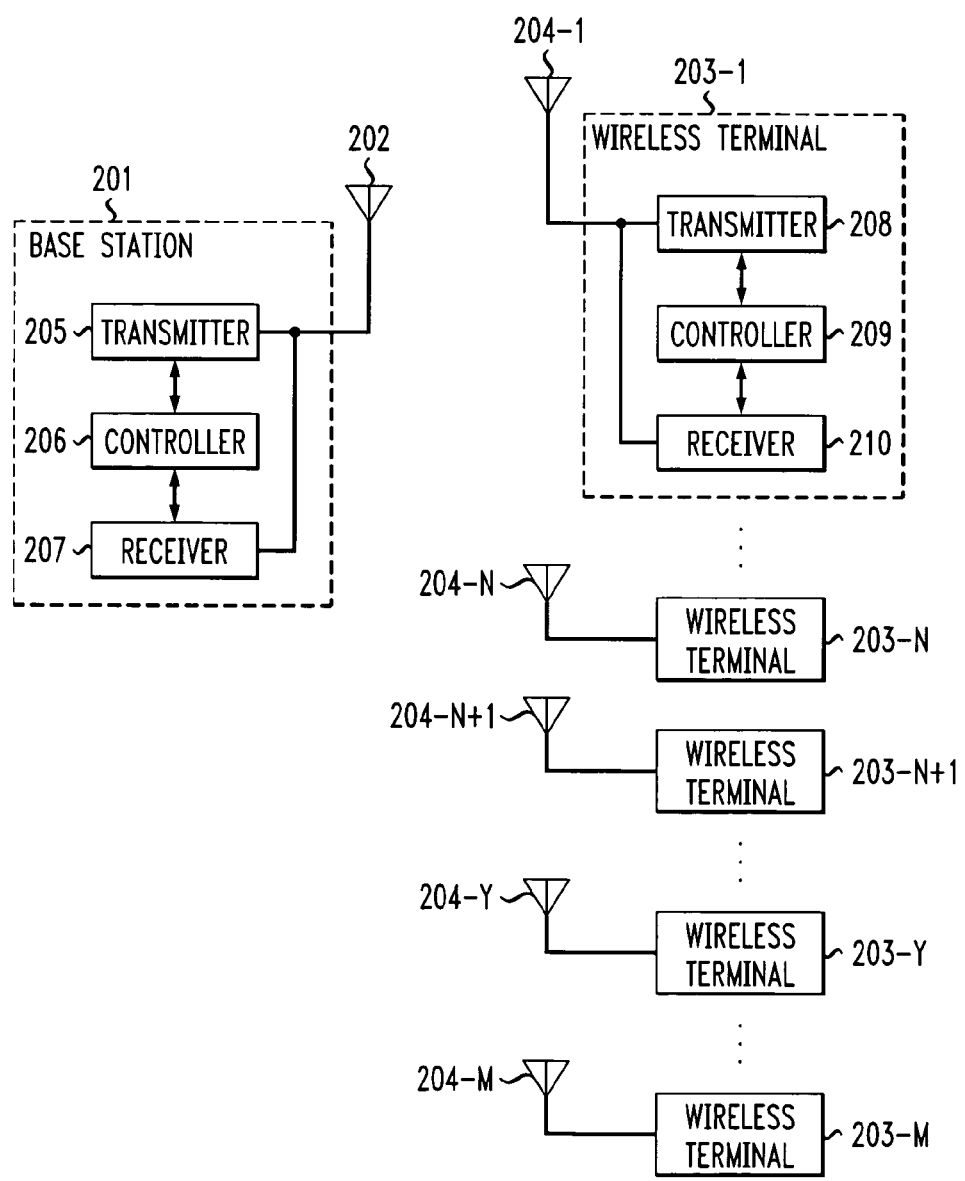
FIG. 2 shows, in simplified block diagram form, details of a base station and a plurality of wireless terminals in which the invention may be employed.

FIG. 2 shows, in simplified block diagram form, a wireless multiple access communications system in which the invention may be advantageously employed. It should be noted that although applicants' unique invention will be described in the context of a mobile wireless communications system, it has equal application to non-mobile, e.g. fixed, wireless communications systems. One such mobile wireless communications system is the Orthogonal Frequency Division Multiplexed (OFDM) based spread spectrum multiple access system.

Specifically, shown in FIG. 2 is a multiple access wireless communications system 200. System 200 includes base station 201 including antenna 202 and one or more remote wireless terminals, i.e., wireless terminals 203-1 through 203-M including associated antennas 204-1 through 204-M, respectively. Transmission of signals is from and to base station 201, to and from remote wireless terminals 203. All of wireless terminals 203 share the transmission spectrum in a dynamic fashion.

In this example, base station 201 includes transmitter 205, receiver 207 and controller 206 for transmitting and receiving wireless messages via antenna 202. Controller 206 is employed to control operation of transmitter 205 and receiver 207, in accordance with the invention. Similarly, in this example, each of wireless terminals 203-1 through 203-M includes transmitter 208, receiver 210 and controller 209 for transmitting and receiving wireless messages via antenna 204. Controller 209 is employed to control operation of transmitter 208 and receiver 210, in accordance with the invention.

In accordance with the invention, base station 201 generates and transmits paging messages in applicants' unique format shown in FIG. 3 and described below to wireless terminals 203. Typically, wireless terminals 203 when not in use are in a standby mode commonly referred to as a "sleep" mode. In the sleep mode, most of the circuitry in the wireless terminals 203 is turned off in order to conserve energy and, thereby, extend battery life. In order for each of the wireless terminals 203 to detect whether there is a paging message intended for it, the particular wireless terminal 203 must come out of the sleep mode, i.e., wake up, and monitor its incoming dedicated periodically occurring time slots for an indication that a paging message has been received for the particular wireless terminal 203, as described below in relationship to FIG. 3.

Figure 3:
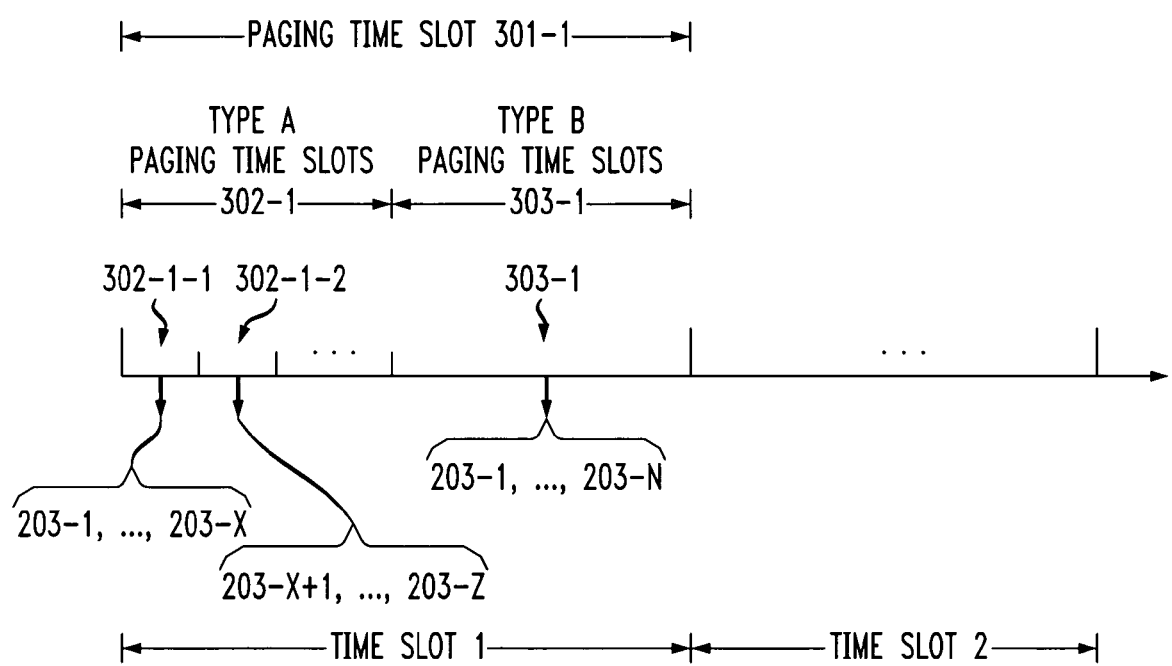
FIG. 3 graphically illustrates applicants' unique paging time slot format, in accordance with the invention.

FIG. 3 graphically illustrates applicants' unique paging time slot format. The format includes a plurality of periodically occurring paging time slots each including at least one relatively short first type paging time slot, referred to as a type "A" paging time slot, that transports an indication whether an associated wireless terminal has been paged and a second type paging time slot, referred to as a type "B" paging time slot, that transports an entire paging message for a particular paged wireless terminal 203, in accordance with the invention. Shown in FIG. 3 is paging time slot 301-1 that is divided, in this example, into type A paging time slots 302-1 and a type B paging time slot 303-1. The type A paging time slots include relatively short duration time slots 302-1-1, 302-1-2, etc. that transport only an indication of whether an assigned wireless terminal 203 has been paged, while type B paging time slot 303-1 includes the complete paging message for the paged wireless terminals 203 that are indicated as being paged in the type A paging time slots 302-1. Thus, in this example, type A paging time slot 302-1-1 has a subgroup including wireless terminals 203-1 through 203-X assigned to it, type A paging time slot 302-1-2 has a subgroup including wireless terminals 203-X+1 through 203-Z assigned to it and so on through wireless terminal 203-N. Also, in this example, type B paging time slot 303-1 transports the complete paging messages for assigned wireless terminals 203-1 through 203-N. The remaining ones of wireless terminals 203 are assigned to other periodically occurring paging time slots in the format.

Thus, wireless terminal 203-1 only decodes its assigned type A paging time slot 302-1-1 to determine whether there is a received paging message for it. Since the type A type paging time slot only transports relatively few bits of information as compared to the complete paging message transported by the type B paging time slot, it is relatively easy to decode. It should be noted that the number of bits used for a type A paging time slot is dependent on the number of wireless terminals assigned to each type A time slot and is left to the implementer. Consequently, there is a significant computational saving in the monitoring process for determining whether or not a particular wireless terminal has been paged with a corresponding saving in battery energy expended.

Figure 4:
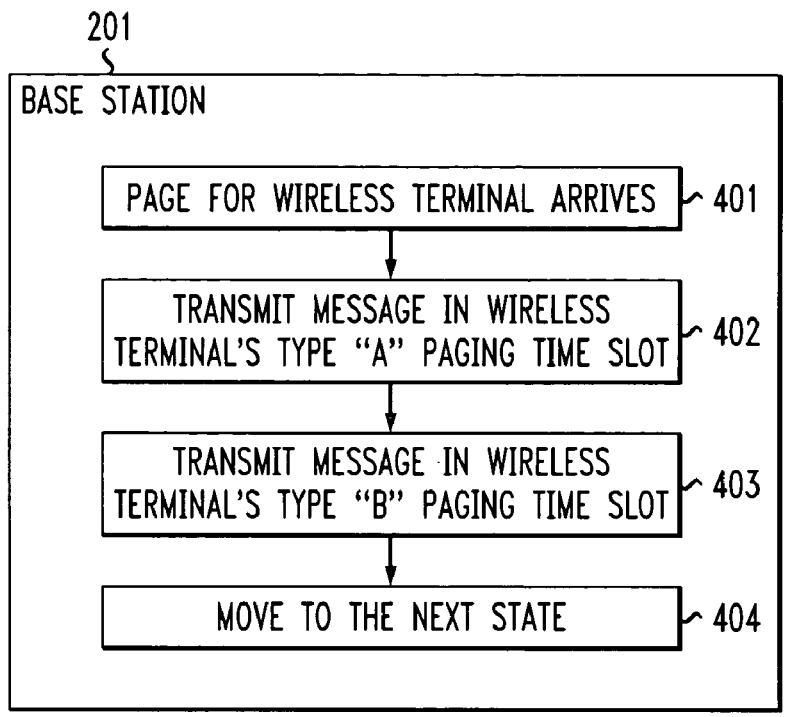
FIG. 4 is a flow chart illustrating the steps in the process of a base station transmitting paging messages.

FIG. 4 is a flow chart illustrating the steps in the process of a base station 201 transmitting a paging message for a particular wireless terminal 203 using applicants' unique format. In step 401 a page indication for a particular wireless terminal 203 arrives. Step 402 causes an indication that the particular wireless terminal 203, for example 203-1, has been paged to be transmitted in the assigned type A paging time slot, in this example, type A paging time slot 302-1-1. Then, in step 403, a paging message is caused to be transmitted in a type B paging time slot 303-1 associated with type A paging time slot 203-1. Finally, in step 404 base station 201 moves to the next state in the paging operation or the transmitting and receiving operation of base station 201.

Figure 5:
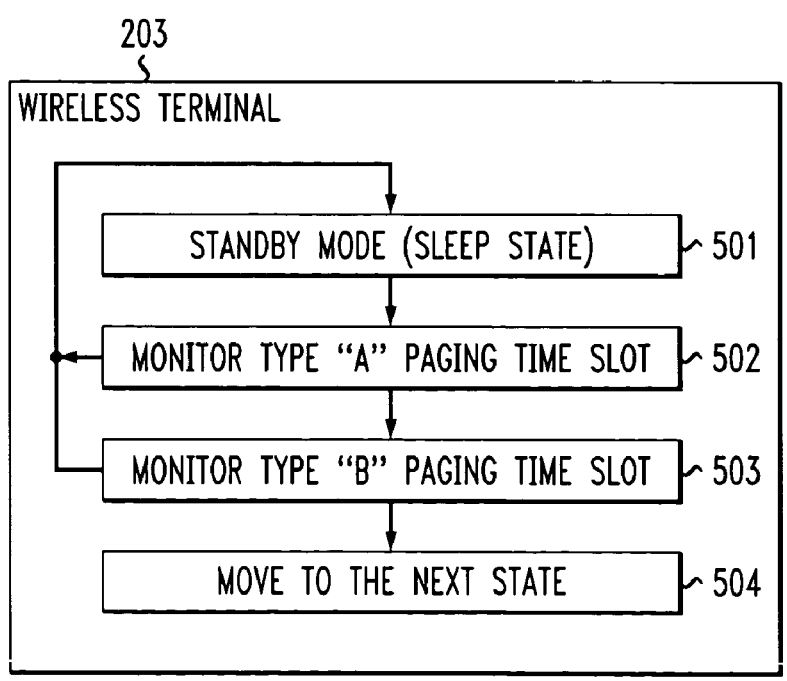
FIG. 5 is a flow chart illustrating the steps in the process of a wireless terminal processing the wireless terminal paging messages.

FIG. 5 is a flow chart illustrating the steps in the process of a wireless terminal 203 processing the wireless terminal paging messages. Initially, the wireless terminal 203, for example wireless terminal 203-1, is in the so-called sleep mode, i.e., standby mode, as indicated in step 501. In step 502, wireless terminal 203-1 periodically wakes up to monitor a type A paging time slot, in this example, 302-1-1, that is assigned to it in order to determine whether or not it has been paged. Note that only a few bits need to be decoded by wireless terminal 203-1 depending on the number of additional wireless terminals 203 that have been assigned to the type A paging time slot 302-1-1. If only one wireless terminal is assigned to each type A paging time slot 302-1 then a simple logical 1 or logical 0 only need be transported, as will be apparent to those skilled in the art. If no valid message is detected in step 502, control is returned to step 501 and wireless terminal 203-1 returns to the sleep mode. If a valid message, i.e., an indication that wireless terminal 203-1 has been paged, is detected in step 502, step 503 causes the associated type B time slot 303-1 to be monitored. If no valid message for the paged wireless terminal 203-1 assigned to type A paging time slot 302-1-1 is detected in step 503 control is returned to step 501 and wireless terminal 203-1 returns to the sleep mode. If a valid message is detected in step 503 for wireless terminal 203-1, step 504 causes wireless terminal to move to its next step in the paging and/or receiving and transmitting process. For example, the wireless terminal 203-1 may execute any action set forth in the paging message. Again, it should be noted that if only one wireless terminal is assigned to a type A paging time slot 302 additional information may have to be included in the paging message transported in its associated type B paging time slot 303 in order to relate the message to the appropriate wireless terminal being paged.

The above-described embodiments are, of course, merely illustrative of the principles of the invention. Indeed, numerous other methods or apparatus may be devised by those skilled in the art without departing from the spirit and scope of the invention. Moreover, the invention may be implemented as hardware, as an integrated circuit, via programming on a microprocessor, on a digital signal processor or the like.

What is claimed is:

1. A method for use in a base station of a wireless communications system including at least one base station and one or more wireless terminals to transmit paging messages comprising the steps of:
   generating a paging time slot format including one or more periodically recurring paging time slots, wherein each individual one of said one or more paging time slots includes one or more of first type paging time slots, and at least one associated second type paging time slot, each of said first type paging time slots including fewer bits than said associated second type paging time slot and being used to transport an indication that a particular one of said one or more wireless terminals has been paged, and said associated second type paging time slot being used for transporting a paging message for a paged wireless terminal; and transmitting periodically said paging time slots to at least one particular wireless terminal.

2. The method as defined in claim 1 wherein a plurality of said first type paging time slots is associated with a particular second type paging time slot.

3. The method as defined in claim 1 wherein a separate subgroup of wireless terminals is assigned to each of said one or more first type paging time slots.

4. The method as defined in claim 3 wherein each of said first type paging time slots is used to transport an indication of any particular wireless terminal in its assigned subgroup that has been paged.

5. The method as defined in claim 1 further including the steps of transmitting an indication that a particular wireless terminal has been paged in an assigned first type time slot and transmitting a paging message for the paged wireless terminal in said associated second type time slot to transport said indication that said particular wireless terminal has been paged.

6. Apparatus for use in a base station of a wireless communications system including at least one base station and one or more wireless terminals to transmit paging messages comprising:

a generator for generating a paging time slot format including one or more periodically recurring paging time slots to transmit paging messages to one or more wireless terminals, wherein each of said one or more paging time slots includes one or more of first type paging time slots, and at least one second type paging time slot, each of said first type paging time slots being used to transport an indication that one of said one or more particular wireless terminals has been paged and an associated second type paging time slot for transporting a paging message for a paged wireless terminal; and a transmitter for transmitting said paging time slot format to said one or more wireless terminals.

7. The apparatus as defined in claim 6 wherein a plurality of said first type paging time slots is associated with a particular second type paging time slot.

8. The apparatus as defined in claim 6 wherein a separate subgroup of wireless terminals is assigned to each of said one or more first type paging time slots.

9. The apparatus as defined in claim 8 wherein each of said first type paging time slots is used to transport an indication of any particular wireless terminal in its assigned subgroup that has been paged.

10. The apparatus as defined in claim 6 wherein said transmitter is controlled to transmit an indication that a particular wireless terminal has been paged in an assigned first type time slot and to transmit a paging message for the paged wireless terminal in a second type time slot associated with said first type time slot transporting said indication that said particular wireless terminal has been paged.

11. Apparatus for use in a base station of a wireless communications system including at least one base station and one or more wireless terminals to transmit paging messages comprising:

means for generating a paging time slot format including one or more periodically recurring paging time slots to transmit paging messages to one or more wireless terminals, wherein each of said one or more paging time slots includes one or more of first type paging time slots, and at least one second type paging time slot, each of said first type paging time slots being used to transport an indication that one of said one or more particular wireless terminals has been paged and an associated second type paging time slot for transporting a paging message for a paged wireless terminal; and means for transmitting said paging time slot format to said one or more wireless terminals.

* * * * *